(12) United States Patent
Ninness et al.

(10) Patent No.: US 6,257,647 B1
(45) Date of Patent: *Jul. 10, 2001

(54) TONNEAU COVER SYSTEM

(75) Inventors: Raymond W. Ninness, Eastpointe; Gregory A. Brower, Fenton, both of MI (US)

(73) Assignee: Bestop, Inc., Broomfield, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,084

(22) Filed: Jan. 15, 1999

Related U.S. Application Data

(60) Provisional application No. 60/071,622, filed on Jan. 16, 1998.

(51) Int. Cl.⁷ .................................................. B60P 7/04
(52) U.S. Cl. .............................. 296/100.15; 296/100.16; 296/100.18; 160/328; 160/290.1
(58) Field of Search .......................... 296/100.11, 100.12, 296/100.15, 100.16, 100.17, 100.18, 105; 160/84.06, 290.1, 328, 329

(56) References Cited

U.S. PATENT DOCUMENTS

| 559,019 | * | 4/1896 | Zugermayer | 160/26 |
|---|---|---|---|---|
| 1,026,864 | * | 5/1912 | Hiney | 160/25 |
| 2,771,319 | * | 11/1956 | Renquist | 296/100 |
| 4,547,014 | * | 10/1985 | Wicker | 296/100 |
| 4,757,854 | * | 7/1988 | Rippberger | 160/391 |
| 5,251,951 | * | 10/1993 | Wheatley | 296/100 |
| 5,257,850 | * | 11/1993 | Brim | 296/39.2 |
| 5,301,995 | * | 4/1994 | Isler | 296/100 |
| 5,460,423 | * | 10/1995 | Kersting et al. | 296/100 |
| 5,472,256 | * | 12/1995 | Tucker | 296/100 |
| 5,480,206 | | 1/1996 | Hathaway et al. | 296/36 |
| 5,487,585 | * | 1/1996 | Wheatley | 296/100 |
| 5,511,843 | | 4/1996 | Isler et al. | 296/100 |
| 5,553,652 | | 9/1996 | Rushford | 160/354 |
| 5,655,807 | | 8/1997 | Rosario | 296/98 |
| 5,765,903 | * | 6/1998 | Essig et al. | 296/102 |

* cited by examiner

Primary Examiner—D. Glenn Dayoan
Assistant Examiner—Patricia L. Engle
(74) Attorney, Agent, or Firm—W. Scott Carson

(57) ABSTRACT

A system for removably attaching a tonneau cover over the bed of a pickup truck or similar vehicle. The system includes front, rear, and side rails. The front and two side rails are respectively secured in fixed positions atop the front and side walls of the bed. The rear rail is then suspended to extend between the two side rails across the mouth of the tailgate opening. The ends of the rear rail are inserted into longitudinally extending channels in the side rails and can be slid relative to the fixed, front and side rails. The system also can include one or more support bows that can be inserted into the channels in the fixed, side rails and slid relative to them to spaced positions intermediate the front and rear rails. With the slidable, rear rail, the cover can be selectively tensioned or loosen to ease putting the cover over the bed and taking it off. The tailgate and rear rail sealingly engage each other when the tailgate is closed to make the system substantially watertight.

14 Claims, 8 Drawing Sheets

TONNEAU COVER SYSTEM

RELATED APPLICATIONS

This application claims the benefit of U.S. Provisional Patent Application Serial No. 60/071,622 filed Jan. 16, 1998.

BACKGROUND OF THE INVENTION

1. Field of the Invention

This invention relates to the field of tonneau covers and more particularly, to the field of tonneau covers for the beds of pickup trucks and similar vehicles.

2. Discussion of the Background

Tonneau covers for pickup trucks and similar vehicles (such as sport utility ones with exposed beds or decks) help to cover and protect the beds of the vehicles and any items in them. Such covers would ideally have a relatively low profile (i.e., extend relatively flat across the top of the bed walls) and would be easily moved to cover and uncover the bed and its contents. They would also be easily and conveniently storable on the vehicle when not in use or easily removed completely from the vehicle for separate storage.

With this in mind, the tonneau cover system of the present invention was developed.

SUMMARY OF THE INVENTION

This invention involves a system or arrangement for removably attaching a tonneau cover over the bed of a pickup truck or similar vehicle. The system includes front, rear, and side rails. The front and two side rails are respectively secured in fixed positions by clamps or other means atop the front and side walls of the bed. The rear rail is then suspended to extend between the two side rails across the mouth of the tailgate opening. The ends of the rear rail are inserted into longitudinally extending channels in the side rails and can be slid relative to the fixed, front and side rails. The system also can include one or more support bows that can be inserted into the channels in the fixed, side rails and slid relative to them to spaced positons intermediate the front and rear rails.

In operation and with the front and side rails secured atop the front and side walls of the bed, one or more of the support bows can be inserted directly (or through notches in the side rails) into the channels that extend longitudinally along the side rails. The tips or ends of the bows are preferably provided with spring-biased members. Once these end members are inserted into the channels of the side rails, the bows can be slid forwardly or rearwardly in the channels to the desired locations between the front and rear rails. The tonneau cover can then be placed over the bows and attached to the rails. This is preferably done by inserting belts sewn about the perimeter of the rectangular cover into retaining grooves in the front, rear, and side rails. In one embodiment, the rear rail at this time may be slightly spaced from its rearmost position. The flexible, tonneau cover at this point is slightly loose and the retaining belt on the rear of the cover can be easily inserted into the retaining groove in the rear rail. Thereafter, the tonneau cover can be stretched and drawn taut to its final tension by slidably moving the rear rail rearwardly until spring-biased pins lock into slots in the side rails. The tailgate can subsequently be closed to seal against a flexible seal mounted to and extending across the rear rail. Alternatively, the seal can be mounted on the tailgate to engage the rear rail to form a watertight seal.

To store the tonneau cover, the spring-biased pins of the rear rail are withdrawn from their locked positions to allow the rear rail and attached tonneau cover to move slightly forwardly. This relieves or lessens the tightness of the cover and permits the rear belt of the loosened cover to be easily removed from the retaining groove in the rear rail. It also allows the belts on the sides and front of the cover to be more easily removed from the front and side rails. The cover can then be rolled to a forward position or removed altogether. The bows can also be removed but in the preferred embodiments, they are slid forwardly to positions adjacent each other and the front wall. The rolled up tonneau cover is then supported on the bows adjacent the front wall and secured in place. The rear rail is also preferably slid forwardly in the channels in the side rails wherein the front and rear rails and bows are all positioned adjacent one another at the front of the bed. Alternatively, the bows can be removed and rolled up in the cover or the rear rail and bows can be slid rearwardly out of the channels in the side rails and stored separately if desired. In another approach, the tonneau cover can be attached to the bows and slid forwardly with the bows and rear rail to a position adjacent the front wall of the bed. In doing so, the cover would fold essentially like an accordion.

DETAILED DESCRIPTION OF THE INVENTION

Figure 1:
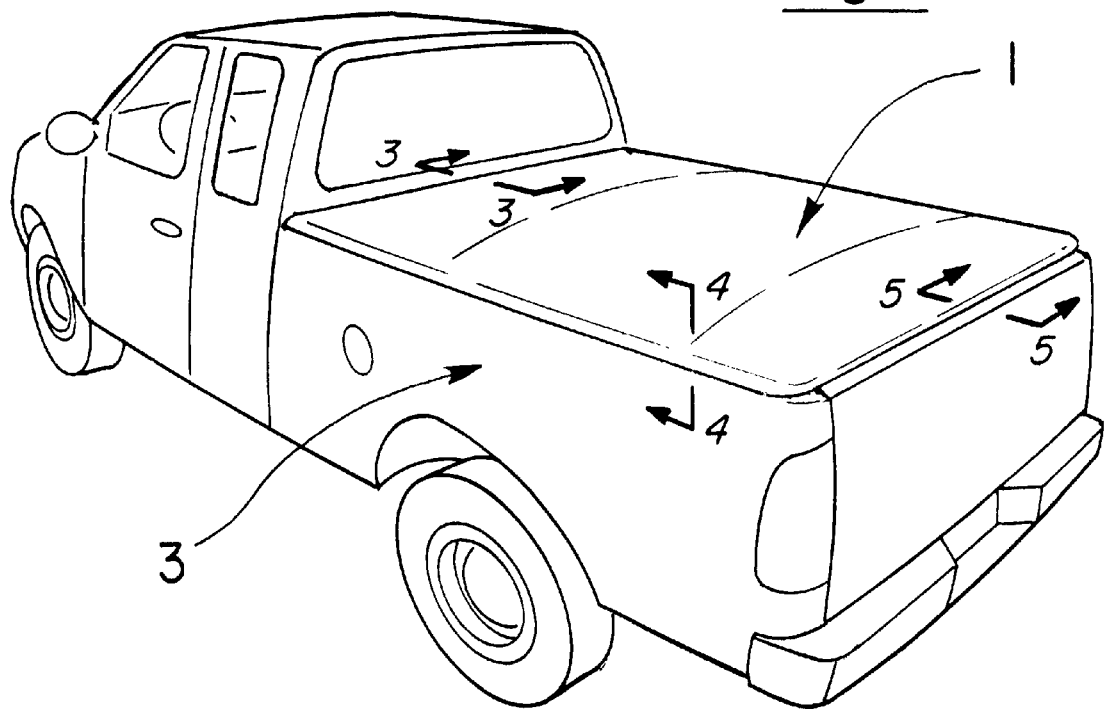
FIG. 1 is a perspective view of the tonneau cover system of the present invention in use covering the bed of a pickup truck.
Figure 3:
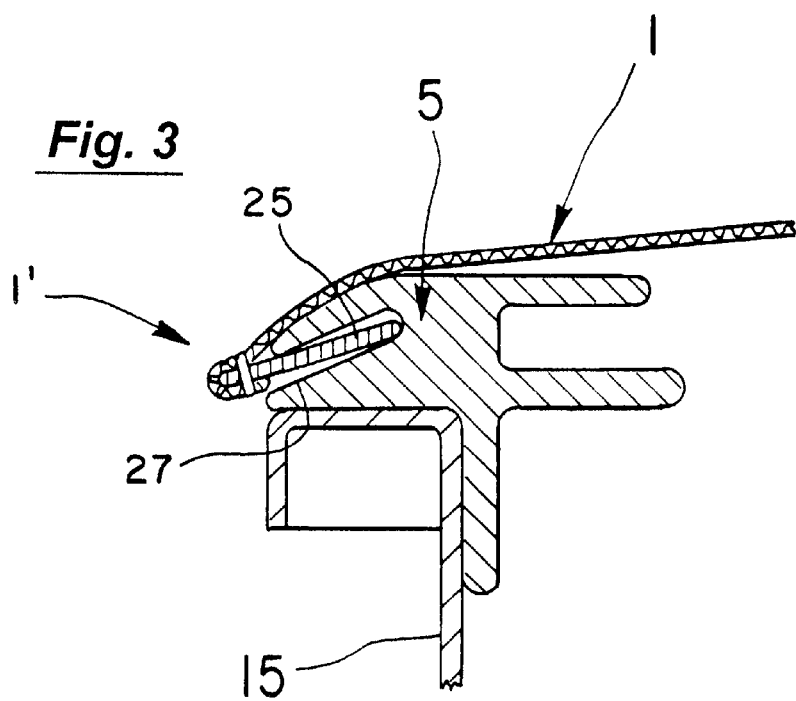
FIG. 3 is a cross-sectional view taken along line 3—3 of FIG. 1.
Figure 2:
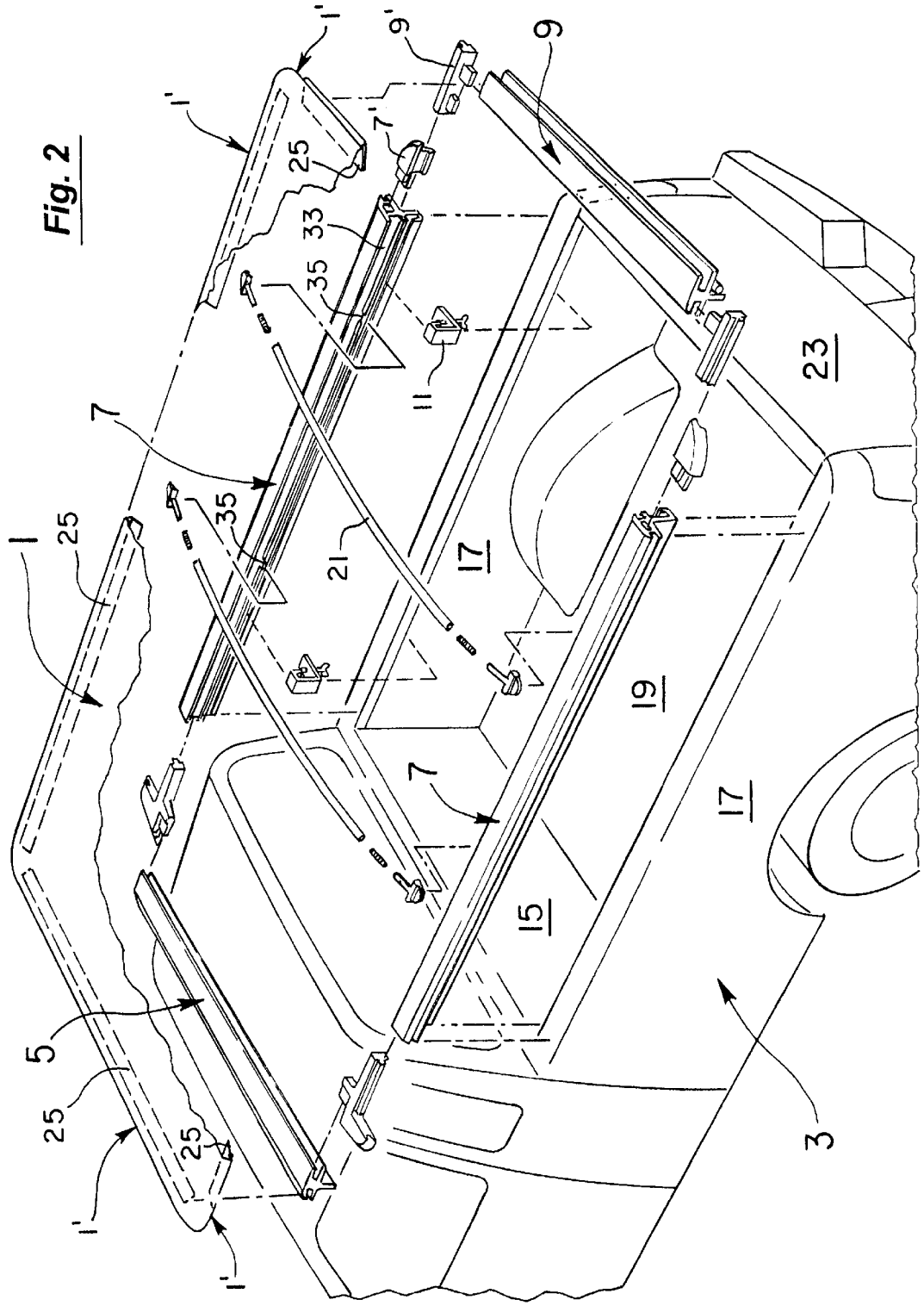
FIG. 2 is an exploded view of the tonneau cover system.
Figure 4:
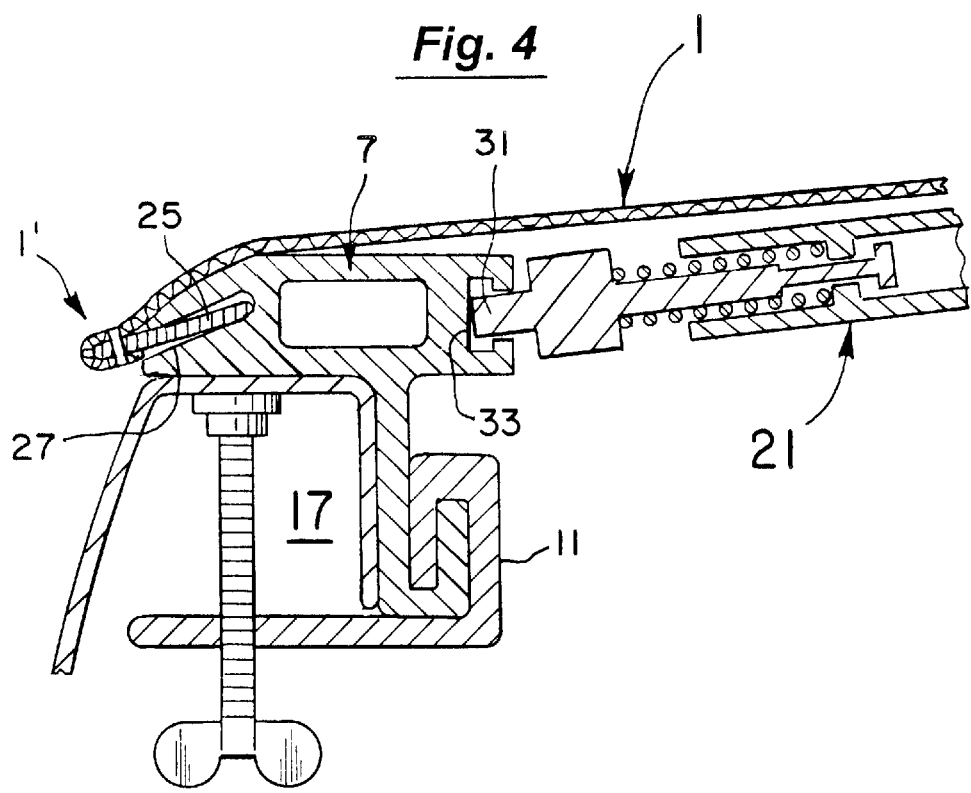
FIG. 4 is a cross-sectional view taken along line 4—4 of FIG. 1.
Figure 5:
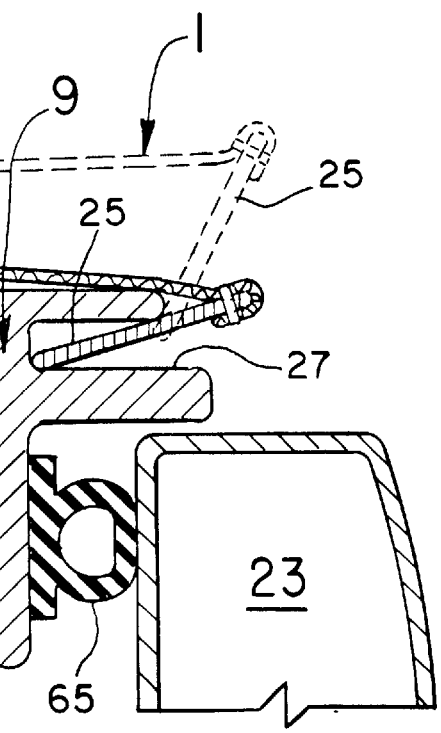
FIG. 5 is a cross-sectional view taken along line 5—5 of FIG. 1.

FIG. 1 shows the tonneau cover 1 of the present invention in position over the bed of a pickup truck 3. The cover 1 is made of flexible material (e.g., canvas or vinyl) that is elastic and slightly stretchable. In the exploded view of FIG. 2, the overall structure of the system of the present invention is illustrated. As shown, the system includes the cover 1 which is removably attachable along its perimeter sides 1' to the rails 5, 7, and 9. Front rail 5 and side rails 7 in turn are affixed (e.g., by clamps 11 in FIG. 2, brackets, or adhesives) atop the front wall 15 and two side walls 17 of the bed 19. These rails 5 and 7 if desired could be molded directly into the walls 15 and 17 but preferably are separate pieces. One or more bows 21 are preferably used to help support the cover 1 over the bed 19. As explained in more detail below, the rear rail 9 is mounted to extend horizontally between the side walls 17 across the mouth of the tailgate opening adjacent the closed tailgate 23. The closed tailgate 23 in this regard forms the fourth wall of the bed 19. FIGS. 3–5 illustrate these features in more detail.

As seen in FIGS. 3–5, the perimeter sides 1' of the cover 1 have sewn-in belts 25 that can be removably attached in grooves 27 in the respective rails 5, 7, and 9. This can be done in the known manner of co-owned U.S. Pat. Nos. 4,757,854 and 5,765,903. For example, as illustrated in FIG. 5, the tip portion of the belt 25 can be inserted into the mouth of the groove 27 by initially stretching the slightly elastic cover 1 to place the belt 25 in the dotted position of FIG. 5. The belt 25 can then be manually rotated or pivoted using the upper edge of the groove 27 as a fulcrum to gain leverage. This will further stretch and tension the cover 1 wherein the cover 1 will thereafter essentially draw the belt 25 into the groove 27 to the position shown in solid lines in FIG. 5. The belt 25 will then be firmly held in place under the residual tension in the stretched, resilient cover 1. The tips of the bow 21 as seen in FIG. 4 have spring-biased, end member 31. In use, each end member 31 is inserted at the desired location into the channel 33 in each side rail 7. Alternatively, each end member 31 can be inserted anywhere along the channel 33 and then slid therealong to the desired location intermediate the front and rear rails 5 and 9. If desired, the end member 31 could have an enlarged, interlocking shape with the channel 33 wherein notches 35 (see FIG. 2) could be provided along the channel 33 to received the enlarged, end members. Once received and captured in the channel 33, the bow 21 could then be slid as desired along the channel 33.

Figure 6:
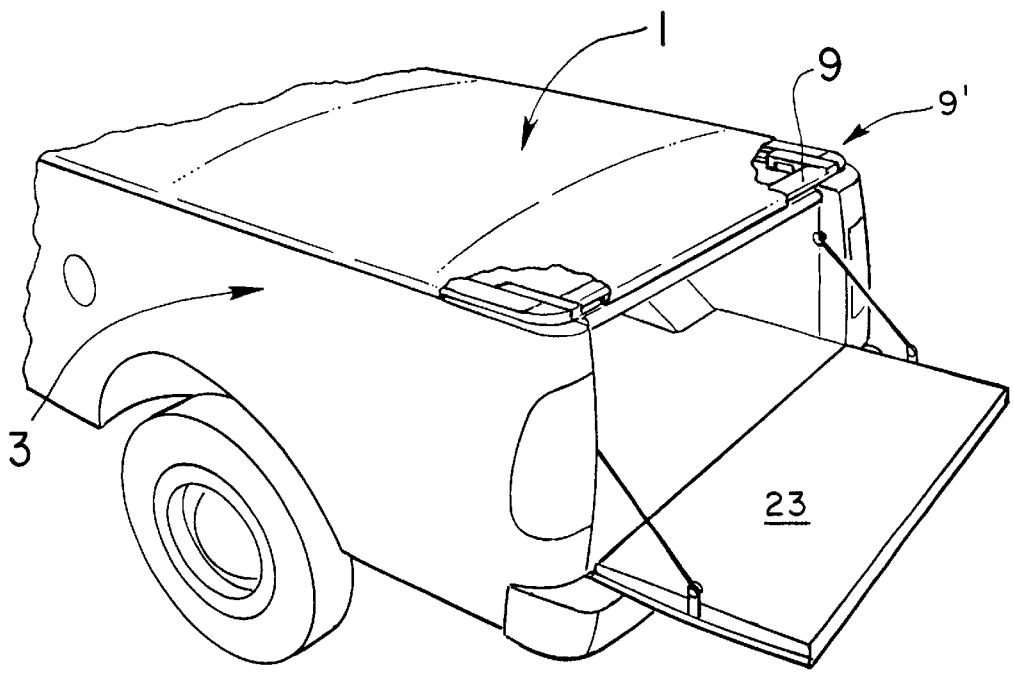
FIG. 6 is a view similar to FIG. 1 with the tailgate shown in its open position.
Figure 7:
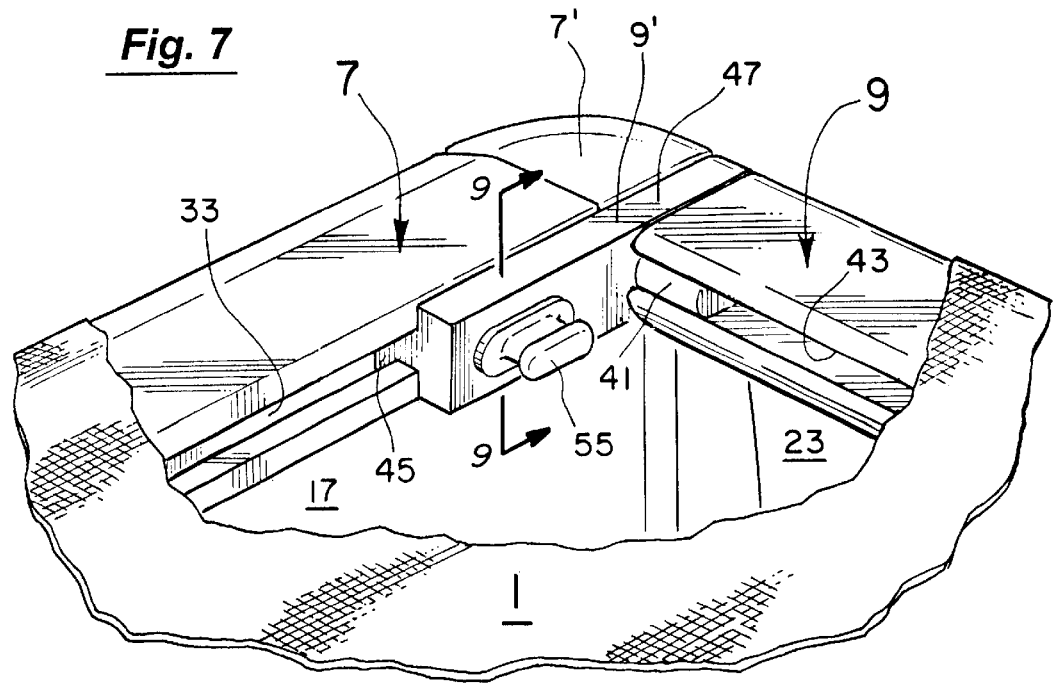
FIG. 7 is an enlarged view of a rear corner area of the tonneau cover system with the cover partially cutaway to show the rear rail in its locked position.
Figure 8:
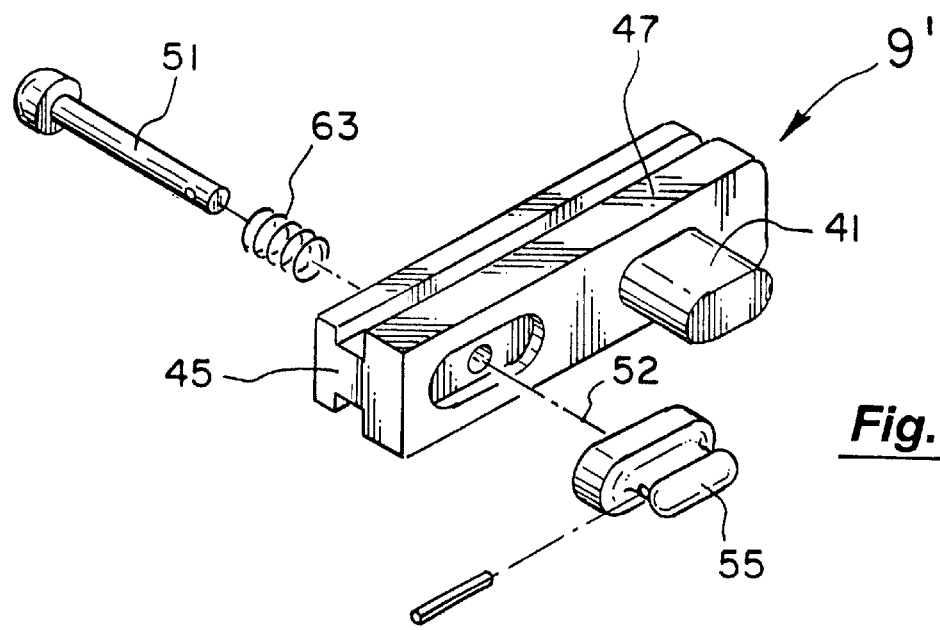
FIG. 8 is an exploded view of the shuttle portion and locking mechanism on each end of the rear rail.
Figure 9:
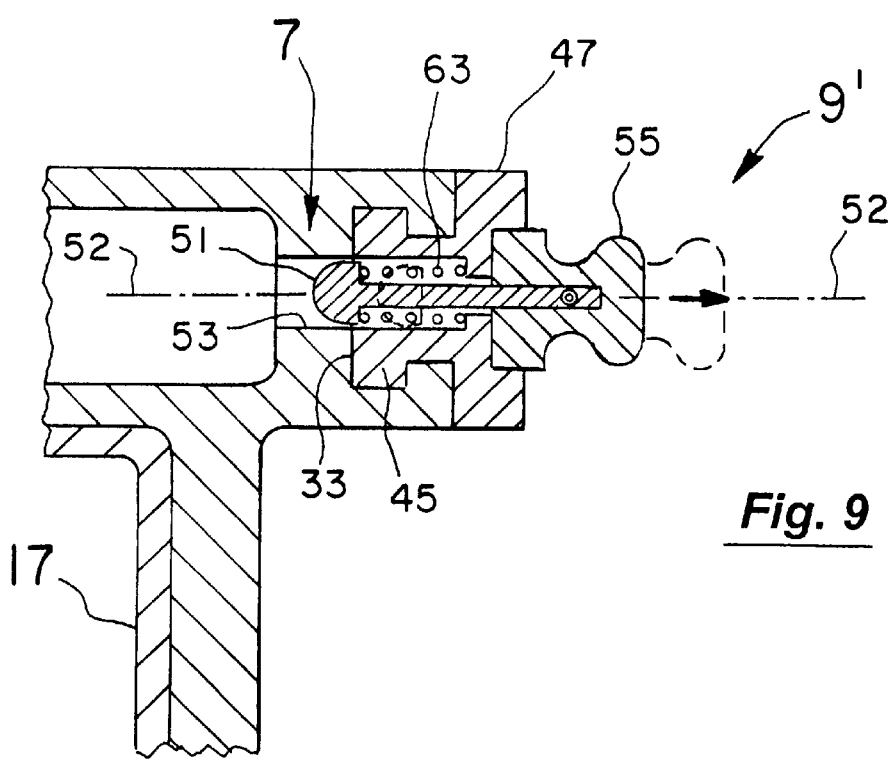
FIG. 9 is a cross-sectional view taken along line 9—9 of FIG. 7.
Figure 10:
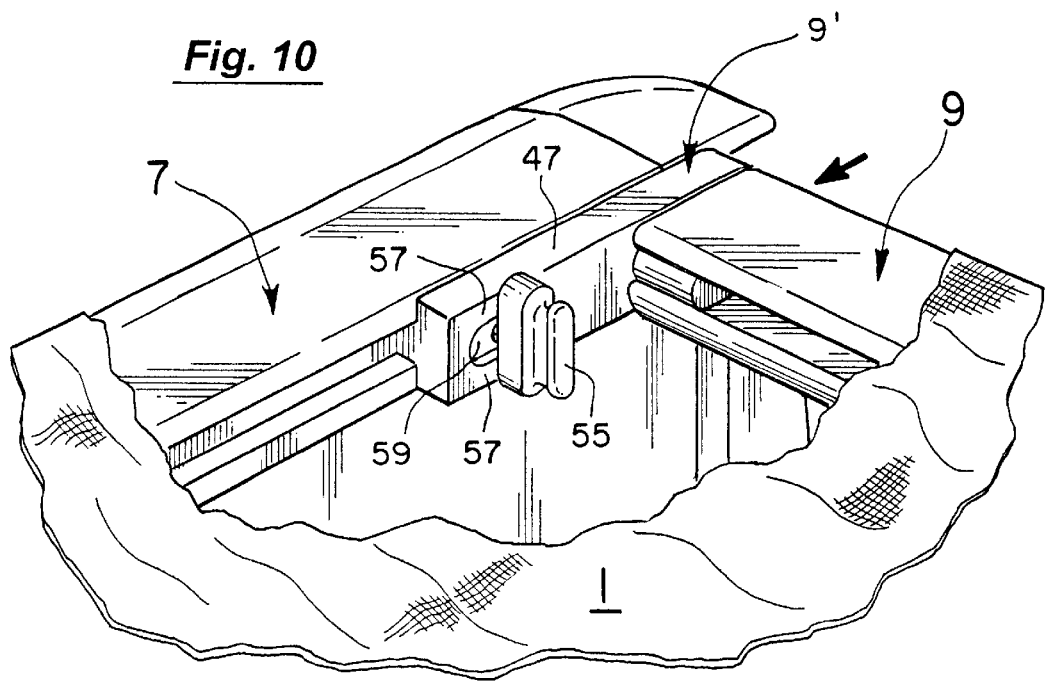
FIG. 10 is a view similar to FIG. 7 showing the rear rail moved to an unlocked position.

Each end 9' of the rear rail 9 as best seen in FIGS. 6 and 7 is slidably received in the channel 33 in each side rail 7 including its corner or end piece 7'. More specifically and referring to FIGS. 7 and 8, each end member 9' of rear rail 9 is attached to the main body of the rear rail 9 by inserting the plug 41 into the channel 43 (see also FIG. 5). The mating channel at 45 of the shuttle portion 47 of end member 9' (see FIGS. 7 and 9) is then slidably received in channel 33 in the respective side rail 7. In FIGS. 7 and 9, the end member 9' is shown in its locked position with the spring-biased pin 51 extended and received (i.e., locked) in the slot 53 in the side rail 7. In this locked position of FIGS. 7 and 9, the cover 1 is preferably in a slightly stretched and tensioned state and is securely being held in place with all of the belts 25 of FIGS. 3–5 being firmly held in their retaining grooves 27. To release the rear rail 9 from its locked position of FIG. 7, the handle 55 of the pin 51 can be grasped and manually pulled to the dotted position of FIG. 9. This will retract or withdraw the pin 51 along its axis 52 out of the slot 53 to the dotted position of FIG. 9. The rear rail 9 can then be slid forwardly substantially in a horizontal plane to the position of FIG. 10. If desired, the handle 55 can be rotated 90 degrees as shown in FIG. 10 to abut and hang up against the sides 57 of recess 59 to keep the pin 51 in its retracted position. The axis 52 of the pin 51 is preferably perpendicular to the longitudinal axis of the channel 33 (i.e., perpendicular to the direction between the front wall 5 and the rear rail 9).

By moving the rear rail 9 forwardly from the position of FIG. 7 to the position of FIG. 10, the cover 1 is loosened and the tension in the cover 1 is relieved. The belt 25 on the rear rail 9 can then be more easily removed from the retaining groove 27. That is, with the rails 5, 7, and 9 in the positions of FIGS. 3–5, the cover 1 can be stretched and attached to the rails 5, 7, and 9 by the belts 25 in the manner discussed above (see also FIG. 5). The cover 1 is then fairly tightly stretched in place both front to back and side to side to have a substantially flat and low profile. In most cases, the lightly tensioned or tightened cover 1 in this condition can be somewhat difficult to remove. This is a desirable characteristic for security and integrity of the tonneau cover system. However, to assist and to make removal of the cover 1 easier, the rear rail 9 can be unlocked and moved forwardly from the position of FIG. 7 to the position of FIG. 10. This will loosen the elastic cover 1 and relieve its tension not only from front to back but also from side to side. To do so, the tailgate 23 can be opened and each handle 55 (see FIG. 9) of the locking mechanisms pulled to retract the pins 51. If desired, the handles 55 can also be rotated 90 degrees after being pulled out to hold the pins 51 in their retracted positions as discussed above. Upon retracting the pins 51 from the slots 53 in the side rails 17 of the side walls 7, the rear rail 9 will usually be slightly moved or pulled forwardly under the force of the tensioned cover 1. The rear rail 9 can additionally be manually moved forwardly as desired to a position (e.g., FIG. 10) allowing easy removal of the belt 25 from the retaining groove 27 in the rear rail 9 (see FIG. 5). For the most part, the rear rail 9 is moved far enough by the tension of the cover 1 alone that the operator can easily remove the belt 25. As also discussed above, this forward movement of the rear rail 9 relieves tension in the cover 1 not only from front to back but also from side to side making it also easier to remove belts 25 from the side rails 7.

Figure 11:
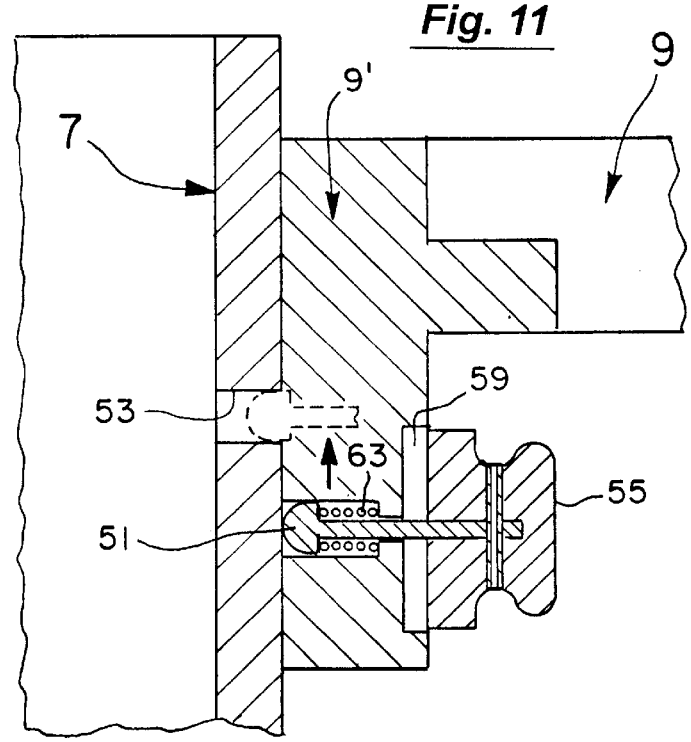
FIG. 11 is a schematic view of the movement of the locking pin from its retracted position to its extended, locked position.

To initially attach the cover 1 as discussed above to the front wall 15, side walls 17, and rear rail 9, the rear rail 9 can be initially positioned in the locked position of FIG. 7. Using the technique of FIG. 5 as also discussed above, the respective belts 25 about the perimeter sides 1' of the cover 1 can be inserted into the respective retaining grooves 27. Alternatively, if desired, the rear rail 9 could be initially positioned in the unlocked position of FIGS. 10 and 12. The loose cover 1 can subsequently be easily attached to the front wall 15, side walls 17, and rear rail 9 (FIG. 12) and the rear rail 9 thereafter manually pulled rearwardly in the direction of 61 in FIG. 12 to the locked position of FIG. 13. In doing so, each locking pin 51 under the bias of spring 63 (see FIG. 11) will slide along the channel 33 in each side rail 7 until the pin 51 reaches the slot 53 (shown in dotted lines in FIG. 11) and is extended under the force of the biasing spring 63 into the slot 53.

Figure 12:
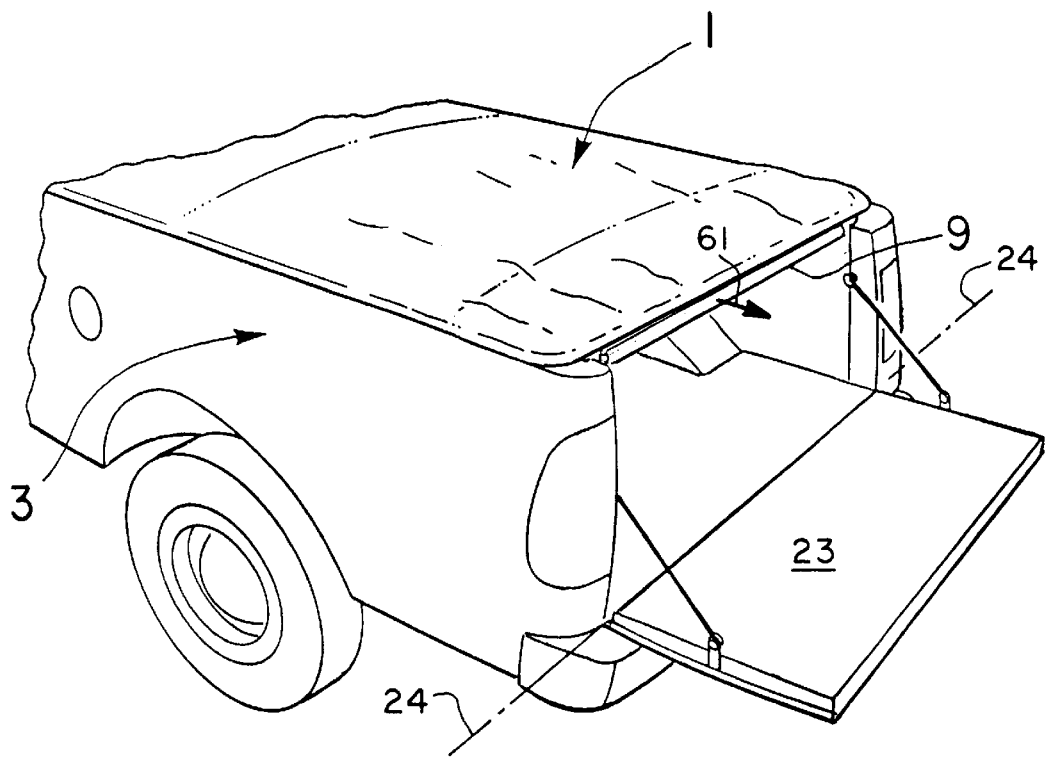
FIGS. 12–13 show one method of tensioning the cover in which the cover is initially attached about its perimeter to the walls of the bed and to the rear rail with the cover in a loose state (FIG. 12). Thereafter, the rear rail is pulled rearwardly to its locked position (FIG. 13) to tension the cover.
Figure 13:
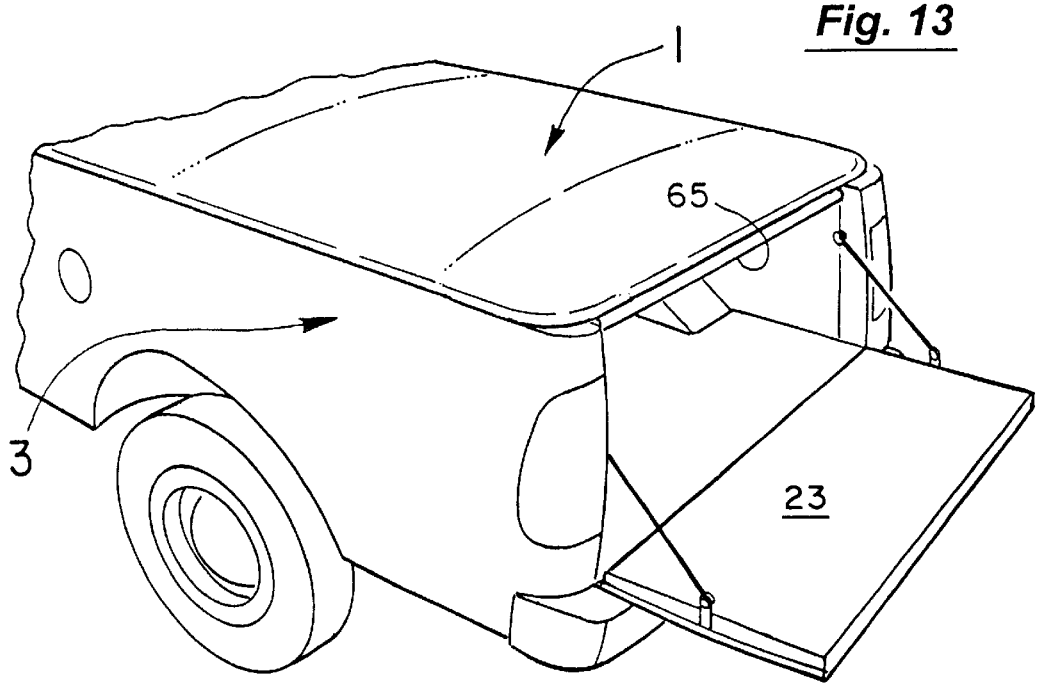

In the preferred embodiments and with the rear rail 9 in the locked position of FIG. 5, the closed tailgate 23 will abut the sealing member 65 on the rear rail 9. The elongated, sealing member 65 could be on either the rear rail 9 or the tailgate 23 but in either case, a substantially watertight seal is created when the tailgate 23 is closed against the rear rail 9. Additionally, as best seen in FIGS. 1, 5, and 13, the tailgate 23 can be opened and closed without having to undo the cover 1 or move the rear rail 9. In this regard, the tonneau cover system of the present invention can remain in its locked position and does not need to be manipulated in any manner to open the tailgate 23 to provide access to the bed 19 and its contents. This is true whether the tailgate 23 is mounted for pivotal movement about a horizontal axis 24 as shown in FIG. 12 or mounted for rotation about a vertical axis.

Figure 14:
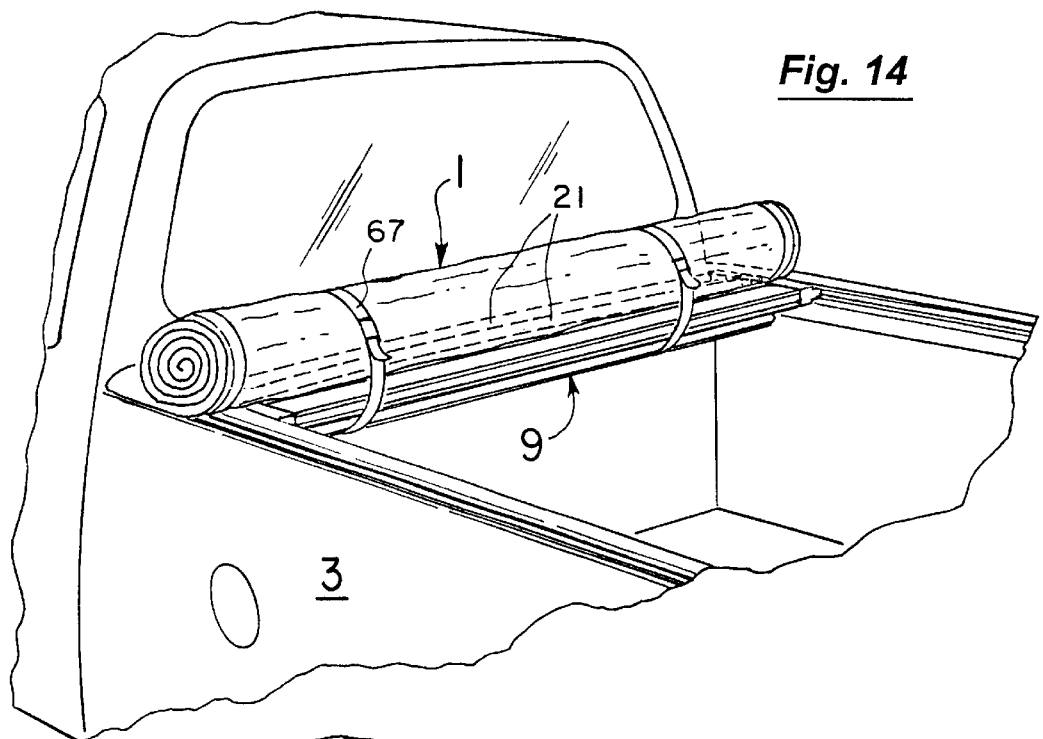
FIG. 14 is a view of the preferred manner in which the cover, bows, and rear rail are stored adjacent the front wall of the pickup truck when not in use.
Figure 15:
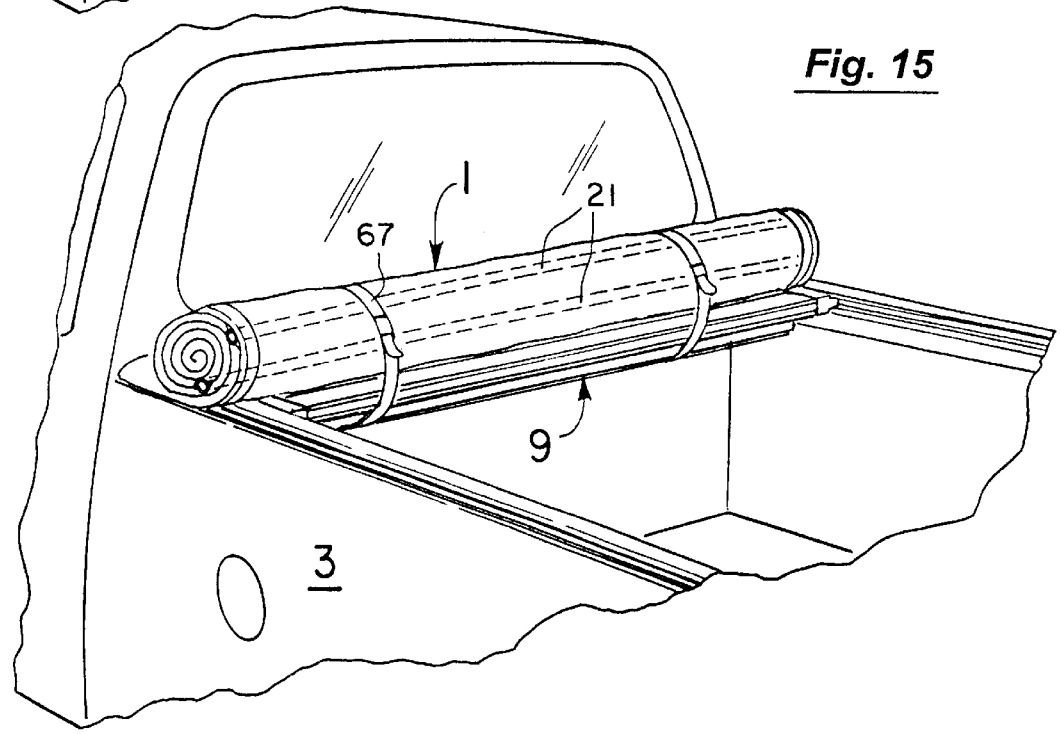
FIG. 15 illustrates another manner in which the system can be stored on the vehicle in which the bows are removed from the side walls and rolled up in the cover.

FIG. 14 illustrates a preferred manner of storing the tonneau cover 1 on the vehicle 3. In this approach, the cover 1 is released from being attached to the rear rail 9 and side walls 17 and rolled up toward the front wall 15. One or more of the bows 21 are then slid forwardly in the channels 33 in the side rails 7 and positioned beneath the rolled up cover 1. In this manner, the bows 21 extending between the side walls 17 support the rolled up cover 1 at a location adjacent the front wall 15 of the truck bed 19. The cover 1 and bows 21 can then be secured in place (e.g., with ties 67). The bows 21 in this regard can either be slid forwardly in the channels 33 of the side rails 7 or be removed and inserted again in the channels 33 immediately adjacent the front wall 15. In yet another approach (see FIG. 15), the cover 1 can be rolled forwardly and as the bows 21 are uncovered, the bows 21 can be removed and added to the roll. In this manner, the bows 21 are then actually rolled up within in the cover 1 for convenient storage and to give the rolled up cover 1 additional rigidity. The rear rail 9 could also be moved forwardly to another locked position adjacent the front wall 15 and rolled up cover 1 and tied up with them at 67. Alternatively, the cover 1 can be completely removed from over the bed 19 of the vehicle 3 as can the bows 21. Additionally, the rear rail 9 can be slid rearwardly completely out of the rails 7 including their end or corner pieces 7' and stored separately if desired. In another approach, the cover 1 can be attached to the bows 21 and the cover 1, attached bows 21, and rear rail 9 can all be slid forwardly with the cover 1 folding essentially like an accordion.

While several embodiments of the present invention have been shown and described in detail, it is to be understood that various changes and modifications could be made without departing from the scope of the invention.

We claim:

1. A tonneau cover system for a bed of a vehicle, said bed having a front wall and two side walls forming three walls of the bed and a tailgate forming a fourth wall of the bed, said tailgate being pivotally mounted for movement about an axis between open and closed positions, said tailgate in said open position providing access to the bed through a tailgate opening extending between and defined in part by said side walls, said tailgate in said closed position forming the fourth wall of said bed, said system including a rear rail mounted to extend substantially horizontally between said two side walls, said rear rail being mounted for sliding movement relative to said two side walls substantially in a horizontal plane toward and away from said front wall between at least a first position and a second locked position, said rear rail in said second position being farther away from said front wall than in said first position, said rear rail in said second position extending substantially horizontally between said two side walls across the tailgate opening, and said system further including a flexible cover made of a substantially continuous piece of slightly elastic and stretchable material attached to said front wall and removably attached to said rear rail and to said two side walls wherein said cover extends substantially flat in a horizontal plane over said bed between said side walls and between said front wall and said rear rail when said rear rail is in said second position and wherein said rear rail can be selectively, slidably moved horizontally between said first and second positions respectively to loosen and to stretch and tension said flexible cover attached thereto and wherein said tailgate in said closed position abuts against said rear rail when said rear rail is in said second position, said cover being removably attached to said rear rail by means slidably engaging said rear rail.

2. The system of claim 1 wherein at least one of said rear rail and said tailgate includes a sealing member and the other of said rear rail and said tailgate abuts said sealing member when said rear rail is in said second position and said tailgate is in said closed position.

3. The system of claim 2 wherein said rear rail includes said sealing member.

4. The system of claim 1 wherein said flexible cover when removed from being attached to said rear rail and said two side walls can be rolled up forwardly to a position adjacent said front wall.

5. The system of claim 4 further including at least one bow extending between said side walls, said bow being mounted for sliding movement relative to said side walls to a position adjacent said front wall beneath said rolled up cover wherein said rolled up cover is supported on said bow.

6. The system of claim 4 further including at least one bow mounted to said side walls to extend therebetween adjacent said front wall beneath said rolled up cover wherein said rolled up cover is supported on said bow.

7. The system of claim 4 further including at least one bow removably mounted to said side walls to extend therebetween wherein said bow can be removed from said side walls and rolled up within said cover as said cover is rolled forwardly.

8. The system of claim 1 further including means for releasably locking said rear rail in said second position.

9. The system of claim 8 wherein said locking means releasably locks said rear rail in said second position to at least one of said side walls.

10. The system of claim 9 wherein said locking means includes first and second portions, said first portion including a pin, means for mounting the pin for movement along an axis between a retracted position and an extended position, and means for biasing said pin toward said extended position, said second portion of the locking means including a slot to receive said pin in said extended position to prevent relative movement between said two portions of the locking means.

11. The system of claim 10 wherein said first portion of said locking means is on said rear rail and said second portion is on at least one of said side walls.

12. The system of claim 10 further including means for maintaining said pin in said retracted position against the force of said biasing means.

13. The system of claim 1 wherein said cover is attached to said front and two side walls by rails affixed respectively atop said front and two side walls.

14. The system of claim 1 wherein said rear rail has a groove therein and said means slidably engaging said rear rail to attach said cover to said rear rail includes a belt secured to said cover and receivable in said groove.

* * * * *